United States Patent
Huang

(10) Patent No.: US 9,299,249 B2
(45) Date of Patent: Mar. 29, 2016

(54) REMOTELY CONTROLLABLE ELECTRONIC DEVICE

(71) Applicant: Wei-Chih Huang, Taipei (TW)

(72) Inventor: Wei-Chih Huang, Taipei (TW)

( * ) Notice: Subject to any disclaimer, the term of this patent is extended or adjusted under 35 U.S.C. 154(b) by 190 days.

(21) Appl. No.: 14/250,433

(22) Filed: Apr. 11, 2014

(65) Prior Publication Data

US 2015/0294559 A1    Oct. 15, 2015

(51) Int. Cl.
*H04B 10/00*    (2013.01)
*G08C 23/04*    (2006.01)
*H04B 10/66*    (2013.01)

(52) U.S. Cl.
CPC ............... *G08C 23/04* (2013.01); *H04B 10/66* (2013.01)

(58) Field of Classification Search
CPC .... H04B 10/66; H04B 10/676; H04B 10/114; H04B 10/1141; G08C 23/04; G08C 2201/31; G08C 2201/70; H03J 9/06; G06F 1/26
USPC .................................................. 398/106, 111
See application file for complete search history.

(56) References Cited

U.S. PATENT DOCUMENTS

| | | | | |
|---|---|---|---|---|
| 6,771,182 B1 * | 8/2004 | Loh | ........................ | G08C 23/04 340/12.28 |
| 7,952,649 B2 * | 5/2011 | Sato | ........................ | G08C 17/02 348/734 |
| 8,942,694 B2 * | 1/2015 | Woo | ........................ | G08C 17/02 455/41.1 |
| 2009/0040016 A1 | 2/2009 | Ikeda | | |
| 2010/0053468 A1 | 3/2010 | Harvill | | |
| 2012/0005499 A1* | 1/2012 | Chomatil | ............... | G08C 23/04 713/320 |
| 2012/0086870 A1 | 4/2012 | Lee | | |
| 2012/0163827 A1* | 6/2012 | Tan | ........................ | G08C 23/04 398/106 |
| 2013/0019264 A1 | 1/2013 | Rui | | |
| 2013/0258207 A1* | 10/2013 | Kim | ........................ | G08C 17/02 348/734 |
| 2013/0304241 A1 | 11/2013 | Ingale | | |

* cited by examiner

*Primary Examiner* — M. R. Sedighian
(74) *Attorney, Agent, or Firm* — Li & Cai Intellectual Property (USA) Office

(57) ABSTRACT

A remotely controllable electronic device comprises an infrared receiver, a control unit and a toggle detector. The infrared receiver is for wirelessly receiving a plurality of control signals. The control unit is coupled to the infrared receiver and generates a plurality of function signals. Each function signal is corresponding to one of the control signals received by the infrared receiver. The toggle detector is coupled to the control unit and receives electricity from a power source through a switching element. The toggle detector determines the power status of the electricity coming from the switching element in a predetermined period and generates a learning mode signal to the control unit when the switching element is switched a plurality of times during the predetermined period. The remotely controllable electronic device could be control by the control signals of any infrared remote control.

17 Claims, 4 Drawing Sheets

REMOTELY CONTROLLABLE ELECTRONIC DEVICE

BACKGROUND OF THE INVENTION

1. Field of the Invention

The instant disclosure relates to remote control; in particular, to a remotely controllable electronic device.

2. Description of Related Art

The remote control for television is developed in the 1950s. Initially, the remote control is wired to the television. The first wireless remote, introduced in 1955, was called the Flashmatic. The Zenith remote shined highly focused light beams on the receivers located around the screen of the television. At present, many home appliances are able to be controlled by the corresponding remote controls, such as the televisions, the DVD/CD players, the set-top boxes, or the stereo sets.

Please refer to FIG. 1 showing a block diagram of a conventional remote control system. A remote control system 1 comprises a dedicated remote control 11 and a remotely controllable electronic device 12. The remotely controllable electronic device 12 comprises a power supply 121, a actuating means 122, a control unit 123, a status indicating unit 124 (e.g., LED shown in FIG. 1), keypad 125, an IR receiver 126, a power plug 127 and a switching element 128. The IR receiver 126 receives the IR control signal from the dedicated remote control 11, and then the control unit 123 generates a corresponding function signal to control the actuating means 122. The actuating means 122 is utilized to perform the functions of the controlled electronic device 12. For example, the electronic device 12 may be a lamp or a fan, in which the actuating means 122 would perform the functions of the electronic device 12. For example, when the electronic device 12 is a lamp or a fan, the actuating means 122 may be the lamp driver or the motor of the fan. It is worth mentioning that the power plug 127 is for connecting to a power source (e.g., the city power supply), and the switching element 128 (which is usually the power button) is for switching the power status of the electronic device 12. The control unit 123 usually has a demodulator circuit 1231, a logical circuit 1232 (e.g., a MCU shown in FIG. 1) and a memory unit 1233. The demodulator circuit 1231 connected to the IR receiver 126 demodulates the IR control signal from the dedicated remote control 11, and the demodulated result is transmitted to the control unit 1232. The logical circuit 1232 executes a function process according to the demodulated result, wherein the logical circuit 1232 may read the memory unit 1233 to perform the corresponding functions.

However, each electronic device usually has its dedicated remote control; therefore many remote controls could exist in each family for everyday life. The user needs to utilize the dedicated remote control to control the corresponding electronic device, which is not convenient for the user. Furthermore, the manufactures of the electronic devices need to design the dedicated remote controls corresponding to their electronic products, and the related cost of the remote controls may not be saved.

SUMMARY OF THE INVENTION

The object of the instant disclosure is to offer a remotely controllable electronic device which could be remotely controlled by any infrared remote controller.

In order to achieve the aforementioned objects, according to an embodiment of the instant disclosure, a remotely controllable electronic device is provided. The remotely controllable electronic device comprises an infrared receiver, a control unit and a toggle detector. The infrared receiver is for wirelessly receiving a plurality of control signals. The control unit is coupled to the infrared receiver and generates a plurality of function signals. Each function signal is corresponding to one of the control signals received by the infrared receiver. The toggle detector is coupled to the control unit and receives electricity from a power source through a switching element. The toggle detector determines the power status of the electricity coming from the switching element in a predetermined period and generates a learning mode signal to the control unit when the switching element is switched a plurality of times during the predetermined period.

In summary, the remotely controllable electronic device could start the learning mode after detecting the power status switched by the switch element in a predetermined period. After the learning process being executed in the learning mode, the remotely controllable electronic device could be control by the control signals of any infrared remote control. Thus, the user could use any infrared remote control to control the remotely controllable electronic device, and the related cost of the dedicated remote control of the electronic device could be saved accordingly.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
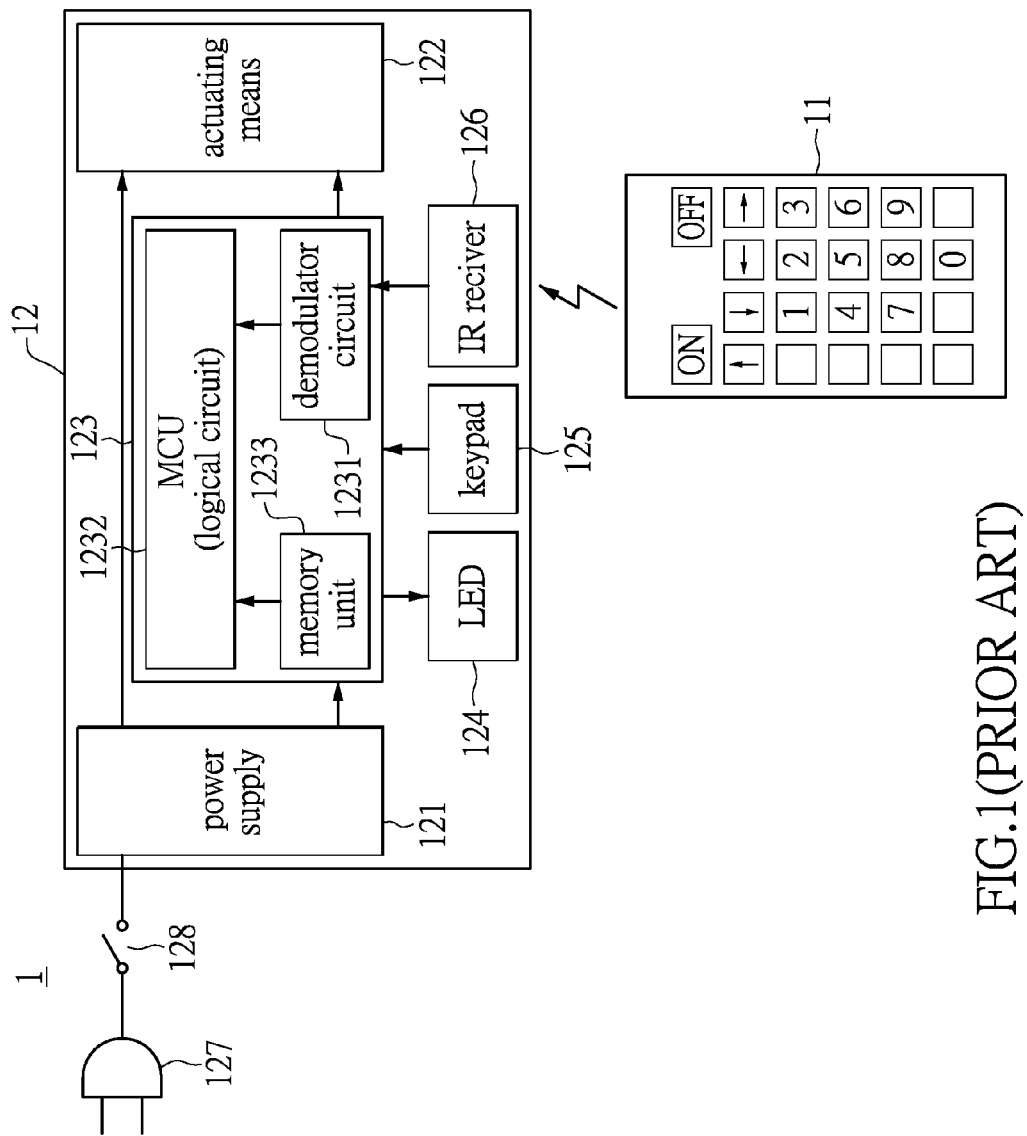
FIG. 1 shows a block diagram of a conventional remote control system.
Figure 2:
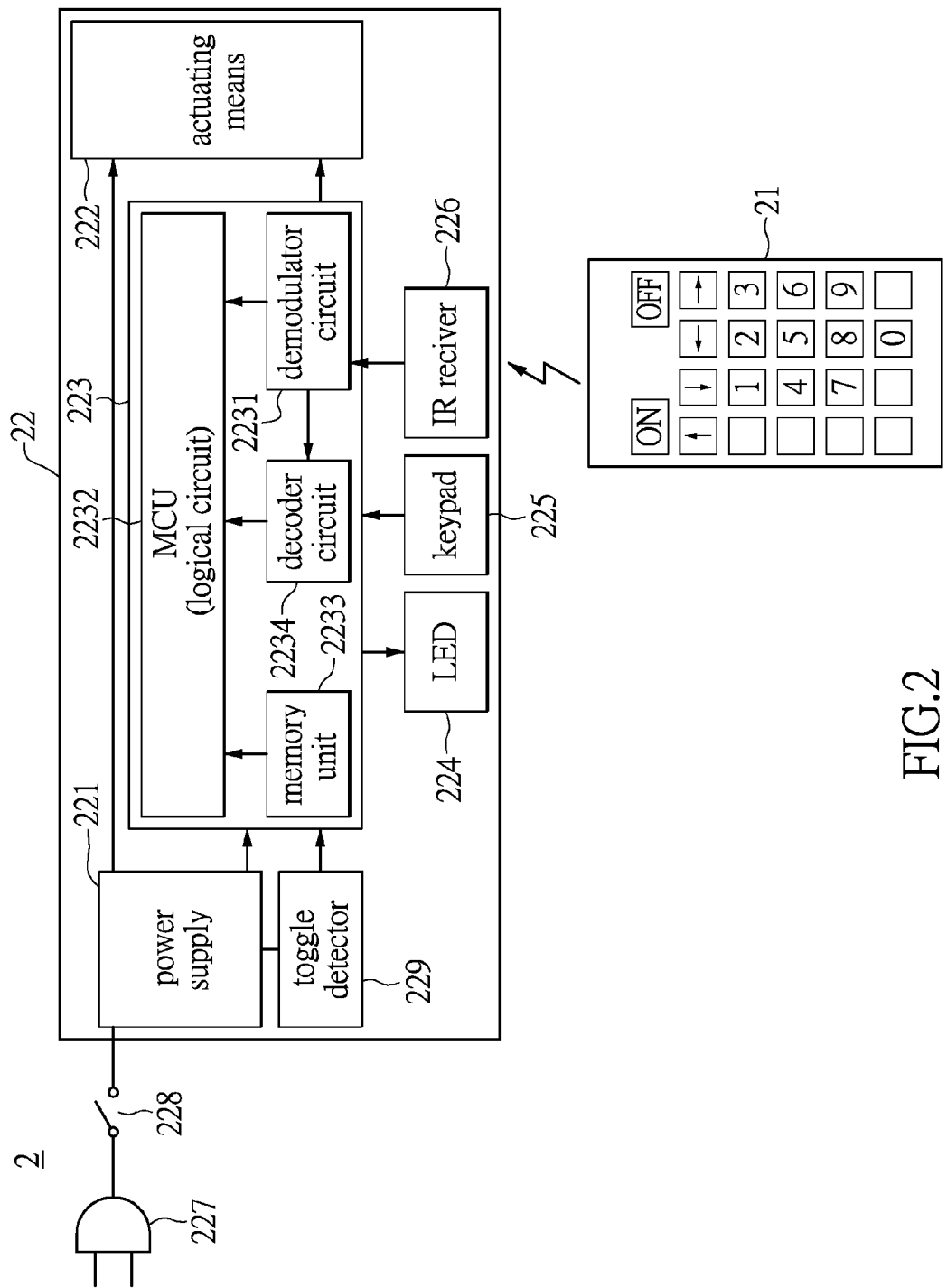
FIG. 2 shows a block diagram of a remote control system according to an embodiment of the instant disclosure.

Please refer to FIG. 2 showing a block diagram of a remote control system according to an embodiment of the instant disclosure. A remote control system 2 comprises a remote control 21 and a remotely controllable electronic device 22. Differing from the conventional dedicated remote control 11 disclosed in the related art, the remote control 21 may be any IR remote control for any brand of home appliance. The remotely controllable electronic device 22 could enter a learning mode to learn the IR controls signals of any IR remote control 21. Specifically, the remotely controllable electronic device 22 comprises a power supply 221, an actuating means 222, an infrared (IR) receiver 226, a control unit 223, a status indicating unit 224, a keypad 225, a power plug 227, a switching element 228 and a toggle detector 229. The infrared receiver 226 is for wirelessly receiving a plurality of control signals from the remote control 21. The control unit 223 may be a microprocessor or a logical circuit constituted of several logic gates and related circuit. The power supply 221 is connected to the power source through the power plug 227 and the switching element 228. That is, the switching element 228 is a power switch connected between the power supply 221 and the power source. The control unit 223 is coupled to the infrared receiver 226, the power supply 221, the toggle detector 229, the status indicating unit 224, the keypad 225 and the actuating means 222. The toggle detector 229 is connected to the power supply 221. The power supply 221 provides electricity to the toggle detector 229, the control unit 223 and the actuating means 222. The remotely controllable electronic device 22 may be a lamp, a fan. The keypad 225 may control the functions of the remotely controllable electronic device 22. For some applications, the status indicating unit 224, the keypad 225 may be omitted.

The control unit 223 generates a plurality of function signals to control the actuating means 222. Each function signal is corresponding to one of the control signals received by the infrared receiver 226. The toggle detector 229 receives electricity from the power source through the switching element 228 and the power supply 221. The toggle detector 229 determines the power status of the electricity coming from the switching element 228 in a predetermined period (e.g., 0.2-1 second) and generates a learning mode signal to the control unit 223 when the switching element 228 is switched a plurality of times during the predetermined period. Details of the control unit 223 and the toggle detector 229 would be described in the following.

The control unit 223 comprises a demodulator circuit 2231, a decoder circuit 2234, a memory unit 2233 and a logical circuit 2232 (e.g., the MCU shown in FIG. 2). The demodulator circuit 2231 is coupled to the infrared receiver 226 for demodulating the plurality of control signals received by the infrared receiver 226. The decoder circuit 2234 is coupled to the demodulator circuit for receiving the demodulated control signals in order to decode the control signals. Because the remote control 21 may be any remote control dedicated to any home appliance made by any manufacturer, the decoder circuit 2234 may decode the demodulated control signal according to the IR protocol such as NEC, Philips, RC5, RC6, RC-MM, Toshiba, . . . etc. Compared to the conventional control unit 123, the control unit 223 of the present disclosure could decode a plurality of IR protocols applied to the remote control 21, which means the remote control 21 may be changed. When the remote control 21 is changed to another remote control, the user only have to perform the learning mode again for dedicating the remote control 21 to the remotely controllable electronic device 22. In other words, any remote control 21 could be the dedicated remote control of the remotely controllable electronic device 22 (hereinafter referred to as electronic device 22). However, more than two remote controls could be configured as the dedicated remote controls, and this instant disclosure is not so restricted. The manufacturer of the electronic device 22 does not need to manufacture any dedicated remote control for the electronic device 22. Any IR remote control of any other electronic device could be the dedicated remote control of the electronic device 22 when the decoder circuit 2234 could be applied to decode the IR remote control of any other electronic device. For example, one remote control of the television made by the manufacturer A1 or another remote control of the lamp made by the manufacturer B2 could be applied to control the electronic device 22 (e.g., a fan), as long as the decoder circuit 2234 could decode the IR protocols used by the manufacturers A1 and B2.

The memory unit 2233 stores the learning result made by the logical circuit 2232. In detail, the memory unit 2233 may stores a look up table which records the correspondence between the received IR signals and the functions. The logical circuit 2232 is coupled to the decoder circuit and the memory unit for storing the decoded control signals to the memory unit 2233 when the logical circuit 2232 receives the learning mode signal from the toggle detector 229. The logical circuit 2232 itself may be a microprocessor or a logical circuit made by several logic gates, the present disclosure does not limit the implementation manner of the logical circuit 2232.

Figure 3:
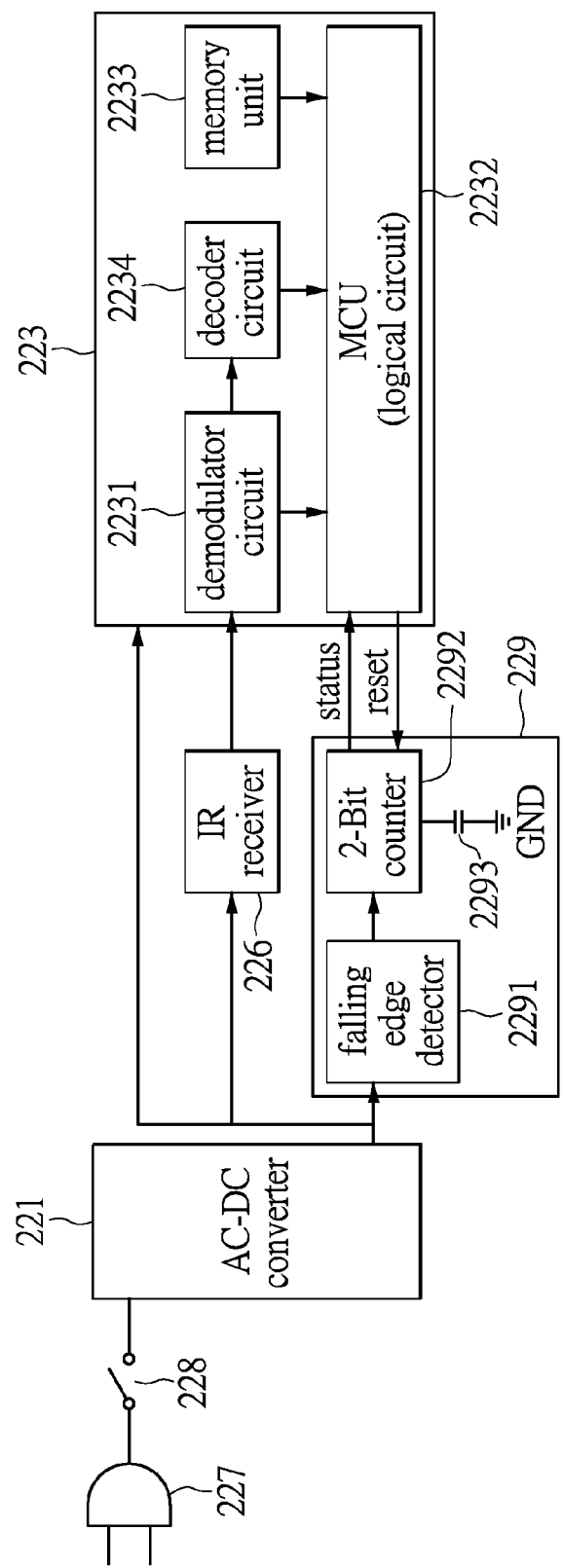
FIG. 3 shows a block diagram of a remote controllable device according to an embodiment of the instant disclosure.

More specifically, FIG. 3 shows a block diagram of a remote controllable device according to an embodiment of the instant disclosure. The power supply 221 is an AC-DC converter. The power supply 221 may be designed according to requirement. For example, if the electronic device is an AC power fan, the power supply 221 may be a regulator. Alternatively, for a Household lamp, the AC-power source is directly provided to the lamp and the circuit of the power supply 221 may be neglected. The switching element 228 shown in FIG. 3 may be changed to connect between the power supply 221 and the toggle detector 229, but the instant disclosure is not so restricted. In FIG. 3, the switching element 228 could be the power switch. For example, the switching element 228 could be a Wall Switch when the electronic device 22 is a ceiling light. The power switch is the conventional power switch of any remotely controllable electronic device, the instant disclosure does not apply any additional switch or button to the electronic device, and however the conventional power switch is utilized to trigger the learning mode. In another embodiment, the switching element may be connected between the power supply and the power source, this instant disclosure does not so restricted. The toggle detector 229 may detect the power switch times the switching element 228 in a predetermined period (e.g., 0.2-1 second). For example, when the user switches the switching element 228 in 0.2 second for three times the toggle detector 229 generates a learning mode signal to the control unit 223 for starting the learning mode. The learning mode of the electronic device 22 could be easily started by manually control of the power switch of the electronic device 22.

In the learning mode, the control unit 223 may sequentially memorize the received and decoded IR control signal to the memory unit 2233 of the control unit 223. For example, if the electronic device 22 is a lamp which has the function of power switch, the user needs to use the remote control 21 to turn on/off the lamp. One button of the remote control 21 shall be defined as the power button of the lamp, a second button of the remote control 21 may be defined as increasing the brightness, and a third button of the remote control 21 may be defined as decreasing the brightness. The control unit 223 of electronic device 22 may be designed to memorize the first received IR control signal as the power switch function, the second received IR control signal as the function of increasing the brightness, and the third received IR control signal as the function of decreasing the brightness in the learning mode. When the learning mode is started the status indicating unit 224 (i.e. LED) could display a preset light, such as a flashing red light. Then, the user could press one button of the remote control 21 to send the first IR control signal, and the control unit 223 memorizes the received first IR control signal as the power switch function. And, the user may further press another button of the remote control 21 to send the second IR control signal for memorizing the second IR control signal as the brightness switch function by the control unit 223. After the control unit 223 sequentially memorized the received IR signals, the pressed buttons of the remote control 21 in the learning mode have been defined as the corresponding functions of the electronic device 22. The remote control 21 has already been the dedicated remote control of the electronic device 22. In practical applications, the user could use a remote control of other home appliance to control the electronic device 22, in which the user could define the rare used buttons of the remote control to control the electronic device 22. Alternatively, the user may define any button of the remote control 21 according to personal habits. Additionally, the memory unit 2233 may memorize more than one set of the IR control signals. The memory unit 2233 may memorize the IR control signals of a remote control X1 in a learning mode. Then, another user may start the learning mode again and use a remote control X2 to send another set of IR control signals to the electronic device 22. Two or more remote controls could be dedicated to control the electronic device 22.

Furthermore, the electronic device 22 operates in a normal mode when the control unit 223 does not receive the learning mode signal, and the logical circuit 2232 generates one of the function signals corresponding to the decoded IR control signal stored in the memory unit 2233 when the electronic device 22 receives the corresponding control signal in the normal mode. More specifically, in the normal operation, when the electronic device 22 receives the IR control signal, the decoder circuit 2234 decodes the IR control signal then logical circuit 2232 determines whether the received IR control signal is the learned control signal in the learning mode. If the received IR control signal is the learned control signal the control unit 223 controls the actuating means 222 to perform the corresponding function, such as changing the brightness of the lamp, changing the volume of the stereo set, altering the fan speed.

Details of the toggle detector 229 would be described in the following. The toggle detector 229 comprises a falling edge detector 2291, a 2-Bit counter 2292 and a status keeper 2293. The toggle detector 229 is for coupling to the switching element 228 through the AD-DC converter 221, and generates a power switching signal according to the power status of electricity coming from the switching element SW. The falling edge detector detects the voltage transition from high to low. The falling edge detector 2291 may be replaced by a rising edge detector detecting the voltage transition from low to high. However, the utilized detector is not so restricted. An artisan of ordinary skill in the art will appreciate the implementation manner, thus there is no need to go into details.

The 2-Bit counter 2292 is coupled to the falling edge detector 2291. The 2-Bit counter 2292 counts the switching times of the power status according to the power switching signal from the falling edge detector 2291, and generates the learning mode signal when the counted switching times is equal to a preset number during the predetermined period. For example, when the 2-Bit counter 2292 counts three power switches, the 2-Bit counter 2292 transmits the learning mode signal (i.e., Status signal to the logical circuit 2232 of the control unit 223 shown in FIG. 3). The 2-Bit counter 2292 may be replaced any other counter, this instant disclosure does not so restricted. The status keeper 2293 is coupled to the 2-Bit counter. The status keeper 2293 may be a capacitor connected between the 2-Bit counter 2292 and a grounding terminal GND for keeping the electricity coming from the switching element during the predetermined period. The predetermined period time is controlled by the status keeper 2293. In other words, the status keeper 2293 temporarily maintains the power for the operation of the 2-Bit counter 2292. When the status keeper 2293 is a capacitor, the capacitor temporarily maintains the voltage level at the node connecting to the 2-Bit counter 2292 until the voltage level is lower than the operation voltage of the 2-Bit counter 2292 due to discharge of the built-in discharge resistor of the capacitor. Specifically, when the switching element 228 is switched from ON to OFF, the status keeper 2293 could hold a voltage temperately, the 2-Bit counter 2292 determines whether the switching element 228 is switched according to the status (e.g. voltage) of the status keeper 2293. For example, when the switching element 228 is switched form OFF to ON for the first time, the status keeper 2293 could be charged. Then, when the switching element 228 is switched from ON to OFF, the status keeper 2293 could hold a voltage from the power source in a predetermined period and the voltage of the status keeper 2293 may be decreased due to leakage current. Then, when the switching element 228 is switched from OFF to ON in the next time before the predetermined period, the counter (2 Bit-counter 2292) could count the second switches. When the switching element 228 is switched from ON to OFF again, the status keeper 2293 would also hold the voltage in the predetermined period again. Then, when the switching element 228 is switched from OFF to ON for the third time before the predetermined period, the counter could count the third switches. Accordingly, the toggle detector 229 disclosed in FIG. 3 is a simple and low cost circuitry. Additionally, the control unit 223 may reset the 2-Bit counter 2292 after the control unit 223 receives the learning mode signal from the 2-Bit counter.

Figure 4:
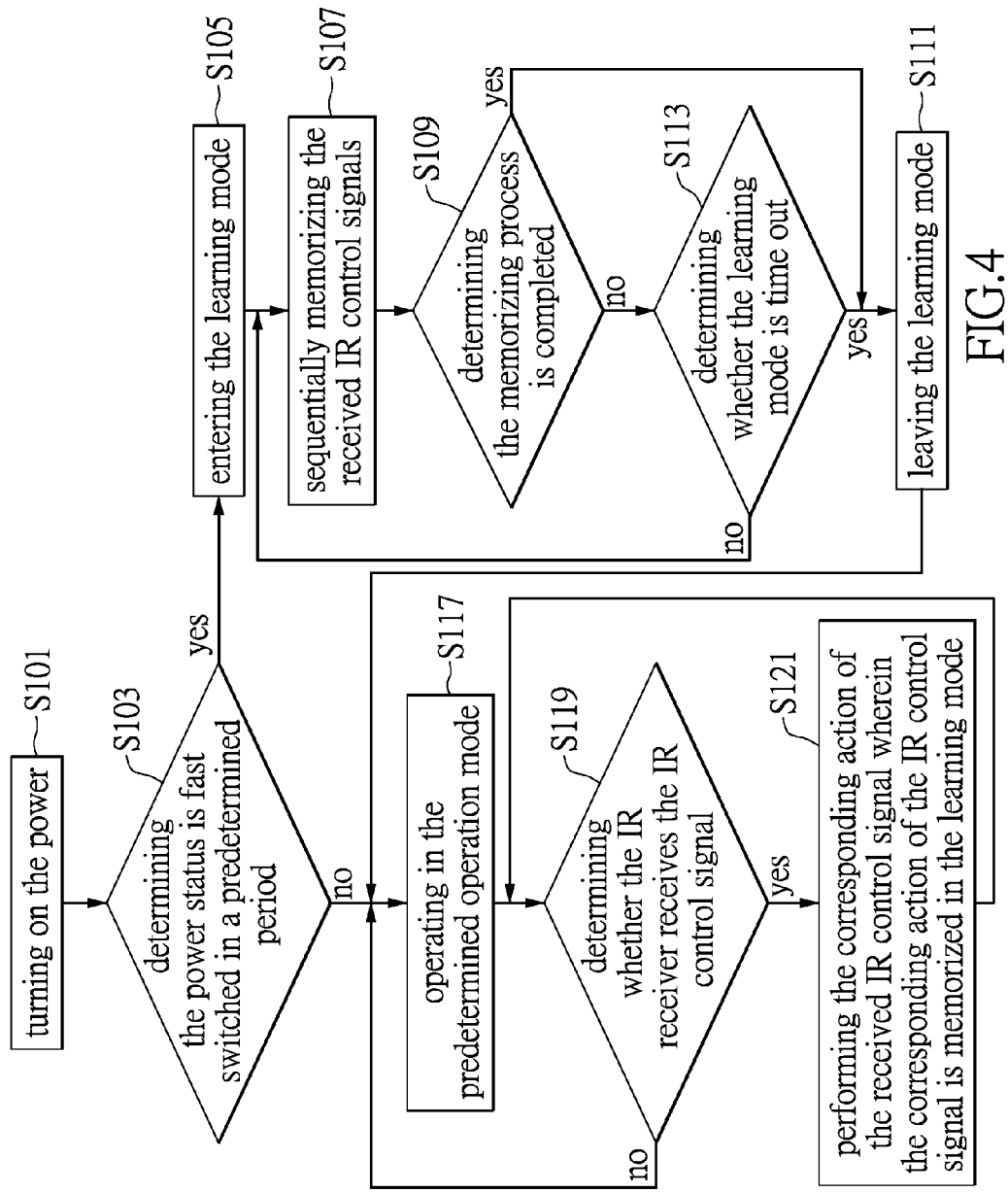
FIG. 4 shows a flow chart of a remote controllable device according to an embodiment of the instant disclosure.

Please refer to FIG. 3 in conjunction with FIG. 4, FIG. 4 shows a flow chart of a remote controllable device according to an embodiment of the instant disclosure. First, in step S101, turning on the power. The user may connect the power plug or turn on the power switch of the electronic device 22. Then, in step S103, the toggle detector determines the power status is fast switched in a predetermined period or not. If the power status is fast switched in a predetermined period (e.g., 0.2 second or 1 second), the go to step S105, otherwise go to step S117. In step S105, the electronic device 22 enters the learning mode. Then, in step S107, the control unit 223 sequentially memorizes the received IR control signals. Then, in step S109, the control unit 223 determines the memorizing process is completed or not. If the memorizing process is completed, go to step S111, otherwise go to step S113. In step S111, leaving the learning mode. In step S113 determining whether the learning mode is time out or not. If the learning mode is time out, go to step S111, otherwise go to step S107 again. If the power status is not fast switched in a predetermined period, then step S117 is executed to operate in the predetermined operation mode which is the normal operation of the electronic devices 22. Then, in step S119, the control unit 223 determines whether the IR receiver 226 receives the IR control signal. If the IR control signal is received, then performs step S121, otherwise performs step S117 again. In step S121, the electronic device 22 performs the corresponding action of the received IR control signal wherein the corresponding action of the IR control signal is memorized in the learning mode in advance. The flow chart of the operation of the electronic device 22 is only for describing the operation of the electronic device 22 in an understandable and clear way, but the present invention is not so restricted.

According to above descriptions, this instant disclosure provides an easy way to make the remotely controllable electronic device start the learning mode. The remotely controllable electronic device could start the learning mode after detecting the power status switched by the switch element in a predetermined period. After the learning process executed in the learning mode, the remotely controllable electronic device could be control by the control signals of any infrared remote control. Thus, the user could use any infrared remote control to control the remotely controllable electronic device, and the related cost of the dedicated remote control of the electronic device could be saved accordingly.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A remotely controllable electronic device, comprising:
   an infrared receiver, for wirelessly receiving a plurality of control signals;
   a control unit, coupled to the infrared receiver, generating a plurality of function signals, wherein each function signal is corresponding to one of the control signals received by the infrared receiver; and
   a toggle detector, coupled to the control unit, receiving electricity from a power source through a switching element, determining the power status of the electricity coming from the switching element in a predetermined period, generating a learning mode signal to the control unit when the switching element being switched a plurality of times during the predetermined period.

2. The remotely controllable electronic device according to claim 1, wherein the toggle detector comprises:
   an edge detector, for connecting to the switching element, generating a power switching signal according to the power status of electricity coming from the switching element;
   a counter, coupled to the edge detector, counting the switching times of the power status according to the power switching signal, generating the learning mode signal when the counted switching times is equal to a preset number during the predetermined period; and
   a status keeper, coupled to the counter, keeping the electricity coming from the switching element during the predetermined period.

3. The remotely controllable electronic device according to claim 1, wherein the control unit comprises:
   a demodulator circuit, coupled to the infrared receiver, demodulating the plurality of control signals received by the infrared receiver;
   a decoder circuit, coupled to the demodulator circuit, receiving the demodulated control signals to decode the control signals;
   a memory unit; and
   a logical circuit, coupled to the decoder circuit and the memory unit, storing the decoded control signals to the memory unit when the logical circuit receives the learning mode signal from the toggle detector.

4. The remotely controllable electronic device according to claim 3, wherein the remotely controllable electronic device operates in a normal mode when the control unit does not receive the learning mode signal, the logical circuit generates one of the function signals corresponding to the decoded control signal stored in the memory unit when the remotely controllable electronic device receives the corresponding control signal in the normal mode.

5. The remotely controllable electronic device according to claim 1, wherein the edge detector is a rising edge detector detecting the voltage transition from low to high.

6. The remotely controllable electronic device according to claim 1, wherein the edge detector is a falling edge detector detecting the voltage transition from high to low.

7. The remotely controllable electronic device according to claim 1, wherein the control unit is a microprocessor.

8. The remotely controllable electronic device according to claim 1, wherein the logical circuit is a microprocessor.

9. The remotely controllable electronic device according to claim 1, further comprises a power supply connected between the switching element and the power source.

10. The remotely controllable electronic device according to claim 9, wherein the power supply is an AC-DC converter or a regulator.

11. The remotely controllable electronic device according to claim 1, further comprises a power supply connected between the switching element and the toggle detector.

12. The remotely controllable electronic device according to claim 11, wherein the power supply is an AC-DC converter.

13. The remotely controllable electronic device according to claim 1, wherein the switching element is a power switch.

14. The remotely controllable electronic device according to claim 2, wherein the status keeper is a capacitor, the capacitor connected between the counter and a grounding terminal.

15. The remotely controllable electronic device according to claim 2, wherein the control unit resets the counter after the control unit receives the learning mode signal from the counter.

16. The remotely controllable electronic device according to claim 1, wherein the remotely controllable electronic device is a home appliance.

17. The remotely controllable electronic device according to claim 16, wherein the remotely controllable electronic device is a lamp, a fan, a stereo set, a washing machine or an oven.

* * * * *